US010792981B2

(12) United States Patent
Lee et al.

(10) Patent No.: US 10,792,981 B2
(45) Date of Patent: Oct. 6, 2020

(54) APPARATUS FOR CONTROLLING AIR FLOW DIRECTION IN SLIM-TYPE AIR VENT FOR VEHICLE

(71) Applicants: Hyundai Motor Company, Seoul (KR); Kia Motors Corporation, Seoul (KR); NIFCO KOREA INC., Asan-si (KR); Hyundai Mobis Co., Ltd., Seoul (KR)

(72) Inventors: Young Ju Lee, Suwon-si (KR); In Seop Kim, Uiwang-si (KR); Young Rok Lee, Hwaseong-si (KR); Young Beom Lee, Bucheon-si (KR); Choong Yeul Kim, Suwon-si (KR); Dae Ig Jung, Suwon-si (KR); Keun Sig Lim, Yongin-si (KR); Ji Won Lee, Cheonan-si (KR); Jae Seob Choi, Yongin-si (KR); Won Sik Kim, Yongin-si (KR)

(73) Assignees: Hyundai Motor Company, Seoul (KR); Kia Motors Corporation, Seoul (KR); NIFCO KOREA INC., Asan-si (KR); Hyundai Mobis Co., Ltd., Seoul (KR)

( * ) Notice: Subject to any disclaimer, the term of this patent is extended or adjusted under 35 U.S.C. 154(b) by 456 days.

(21) Appl. No.: 15/800,445

(22) Filed: Nov. 1, 2017

(65) Prior Publication Data
US 2018/0215238 A1 Aug. 2, 2018

(30) Foreign Application Priority Data

Feb. 1, 2017 (KR) .......................... 10-2017-0014503

(51) Int. Cl.
*B60H 1/34* (2006.01)

(52) U.S. Cl.
CPC ... *B60H 1/3421* (2013.01); *B60H 2001/3471* (2013.01)

(58) Field of Classification Search
CPC ...... B60H 1/34; B60H 1/3414; B60H 1/3421; B60H 2001/3471
USPC ................................ 454/143, 152–153, 155
See application file for complete search history.

(56) References Cited

U.S. PATENT DOCUMENTS

2008/0081550 A1* 4/2008 Shibata ................ B60H 1/3421
454/155
2013/0149952 A1* 6/2013 Demerath ............ B60H 1/3421
454/155

FOREIGN PATENT DOCUMENTS

EP 1810857 A1 * 7/2007 ........... B60H 1/3421

* cited by examiner

*Primary Examiner* — Vivek K Shirsat
*Assistant Examiner* — Ko-Wei Lin
(74) *Attorney, Agent, or Firm* — Morgan, Lewis & Bockius LLP (57) ABSTRACT

An apparatus for controlling an air flow direction in an air vent for a vehicle, may include a single horizontal wing exposed outside through an air duct is disposed and first and second guide wings connected to the single horizontal wing by connection links are vertically and rotatably disposed above and under the single horizontal wing so that the flow of air discharged inside can be easily controlled in upward and downward directions by vertical rotation of both the first guide wing and second guide wing together with the single horizontal wing.

10 Claims, 10 Drawing Sheets

[ UPWARD ]

FIG. 5

[ DOWNWARD ]

[ UPWARD ]

FIG. 9

[ DOWNWARD ]

FIG. 10

APPARATUS FOR CONTROLLING AIR FLOW DIRECTION IN SLIM-TYPE AIR VENT FOR VEHICLE

CROSS-REFERENCE TO RELATED APPLICATION

The present application claims priority to Korean Patent Application No. 10-2017-0014503 filed on Feb. 1, 2017, the entire contents of which is incorporated herein for all purposes by this reference.

BACKGROUND OF THE INVENTION

Field of the Invention

The present invention relates to an apparatus for controlling an air flow direction in a slim-type air vent for a vehicle, and more particularly, to an apparatus for controlling an air flow direction in a slim-type air vent for a vehicle which is configured for easily adjusting an angle of discharge of air in upward and downward directions by having a double link wing as well as a single horizontal wing in an air duct of a slim-type air vent.

Description of Related Art

In general, air vents which discharges air inside a vehicle with a vehicle air conditioner operated include center air vents mounted to a center fascia panel between a driver seat and a passenger seat and side vents mounted to a crash pad in front of the driver seat and the passenger seat.

Figure 1A:
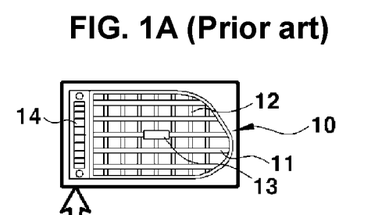
FIG. 1A and FIG. 1B are views illustrating arrangement of a conventional air vent.
Figure 1B:
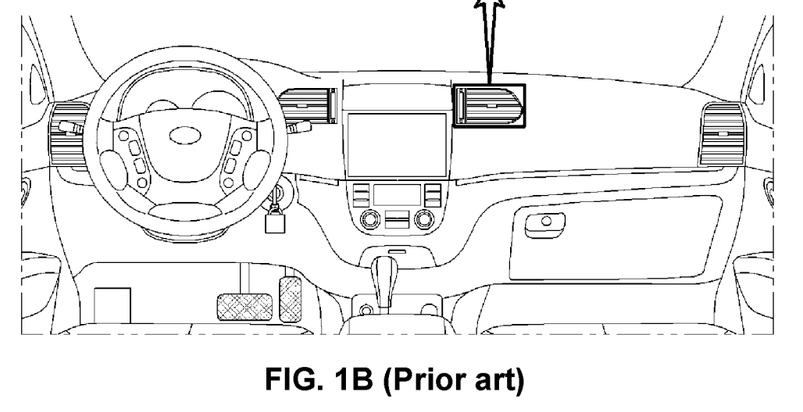

FIG. 1 is a view illustrating the external appearance of a center air vent of a conventional air vent.

As illustrated in FIG. 1, a plurality of horizontal wings 11 and vertical wings 12 are rotatably mounted to the outlet of an air duct 10, and a wind direction control knob 13 is mounted to one of the horizontal wings 11 to adjust the vertical angles of the horizontal wings 11 and the horizontal angles of the vertical wings 12. In addition, a damper control knob 14 is turnably mounted right next to the outlet of the air duct 10.

The existing air vent has at least six or more horizontal wings and vertical wings, and thus, is vertically wide. So, the direction of air discharged inside a vehicle is easily adjusted toward the body of an occupant (i.e. toward the lower portion (navel) and upper portion (face) of the body). However, the air vent is too large to cause a problem of disharmony with peripheral parts and to have design constraints.

Moreover, since the air vent has a structure in which the horizontal and vertical wings are exposed outside, it occupies much space in a center fascia panel or a crash pad so that the freedom of design of a cluster and an AVN system disposed around the air vent is unsatisfactory.

Accordingly, by the enlargement of the cluster and the AVN (Audio Video Navigation) system mounted inside a vehicle, the air vent is disposed at the lower region of the center fascia panel, and the air vent tends to be designed to look slim.

Therefore, a slim-type air vent having only the single horizontal wing exposed outside is produced to improve freedom of design of the cluster and the AVN system.

The slim-type air vent of the present invention adopts a slim air duct having a longer horizontal length and a lower vertical height than those of a conventional air vent. Thus, the slim-type air vent does not require for large space for installation and thus can improve the freedom of design of cluster and AVN system. However, since the slim-type air vent has a structure in which only the single horizontal wing is exposed outside at the outlet of the slim air duct, the flow of air discharged inside may not be controlled with ease in upward and downward directions thereof.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus for controlling an air flow direction in a slim-type air vent for a vehicle, which is characterized in that a single horizontal wing is disposed to be exposed outside through a slim air duct and first and second guide wings connected to the single horizontal wing by connection links are vertically and rotatably disposed above and under the single horizontal wing so that the flow of air discharged inside can be easily controlled in upward and downward directions by the vertical rotation of both the first guide wing and the second guide wing together with the single horizontal wing.

In an exemplary embodiment, an apparatus for controlling an air flow direction in a slim-type air vent for a vehicle includes a single horizontal wing vertically and rotatably mounted at an outlet of a slim air duct to be exposed outside, first guide wings connected to the single horizontal wing while being disposed both above and under the single horizontal to be vertically rotatable, second guide wings connected to rear end portions of the first guide wings while being disposed inside the slim air duct, the second guide wings vertically operating along with the vertical rotation of the first guide wings, and connection links allowing the single horizontal wing to be integrally connected to the first and second guide wings so that the first and second guide wings vertically operate along with the vertical rotation of the single horizontal wing.

The single horizontal wing may have first hinge pins formed at front end portions of both sides thereof to be fastened to an internal wall surface of the slim air duct, and first connection pins formed at rear end portions of both sides thereof to be fastened to the connection links, and the single horizontal wing may be exposed outside through the outlet of the slim air duct and be vertically and rotatably disposed therein.

The single horizontal wing may have an operation knob mounted to an intermediate portion thereof to adjust a vertical angle of the single horizontal wing.

Each of the first guide wings may have second hinge pins formed at front end portions of both sides thereof to be fastened to an internal wall surface of the slim air duct, and second connection pins formed at rear end portions of both sides thereof to be fastened to the connection links, and the first guide wings may be vertically and rotatably disposed above and under the single horizontal wing.

The first guide wings may be disposed to coincide with a garnish or a front panel disposed outside the slim air duct, in forward and backward directions, and be covered by the garnish or the front panel.

Each of the second guide wings may have third connection pins formed at front end portions of both sides thereof to be fastened to the connection links, and third hinge pins formed at rear end portions of both sides thereof to be fastened to an internal wall surface of the slim air duct, and the second guide wings may be vertically and rotatably disposed at the rear end portions of the first guide wings.

The third hinge pins of the second guide wings may be inserted into and fastened to guide grooves formed to be elongated in forward and backward directions in the internal wall surface of the slim air duct so that the second guide wings are rotatable and rectilinearly movable therealong.

The third hinge pins of the second guide wings may be fastened to the internal wall surface of the slim air duct so that each of the second guide wings is rotatable about a predetermined point.

Each of the connection links may include a vertical bar having a first connection hole into which an one of first connection pins of the single horizontal wing is inserted and fastened, and second connection holes vertically formed at a regular distance so that ones of second connection pins of the first guide wings are inserted into and fastened to the second connection holes, and horizontal bars integrally formed at upper and lower end portions of the vertical bar while extending horizontally backward, and having third connection holes which ones of third connection pins of the second guide wings are inserted into and fastened to.

Each of the third connection holes of the horizontal bars may be a slot elongated in forward and backward directions thereof.

Each of the horizontal bars may further extend in proportion to a length of the slot in the forward and backward directions.

Other aspects and exemplary embodiments of the invention are discussed infra.

It is understood that the term "vehicle" or "vehicular" or other similar term as used herein is inclusive of motor vehicles in general including passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2A:
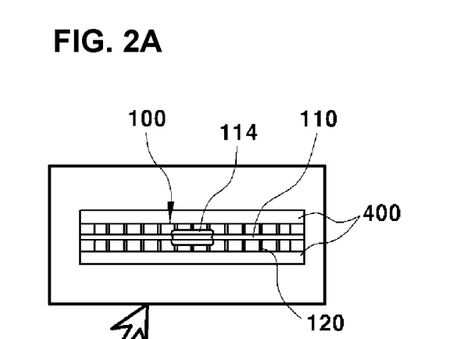
FIG. 2A and FIG. 2B are schematic views illustrating the appearance of a slim-type air vent device for a vehicle according to an exemplary embodiment of the present invention.
Figure 2B:
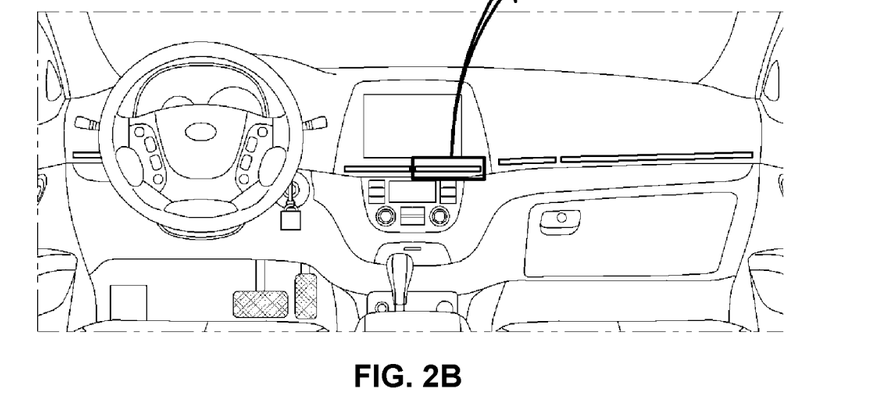

FIGS. 2A and 2B are schematic views illustrating the appearance of a slim-type air vent device for a vehicle according to an exemplary embodiment of the present invention, wherein reference numeral 100 refers to a slim air duct.

The slim air duct 100 has a longer horizontal length and a lower vertical height than those of a conventional air vent. Therefore, it is possible to secure a wider space for installation of a cluster and an AVN system disposed in a center fascia panel or a crash pad, compared to a conventional space, and to improve freedom of design of the cluster and the AVN system.

Only a single horizontal wing 110 is vertically and rotatably mounted at the outlet of the slim air duct 100.

Thus, the slim air duct 100 looks simple since only the single horizontal wing 110 is mounted at the outlet of the slim air duct 100 to be exposed outside.

For reference, reference numeral 120 in FIGS. 2A and 2B refers to vertical wings, and the vertical wings horizontally rotates by a separate mechanism to control an air flow in left and right directions. Since the vertical wings depart from the essence of the present invention, a detailed description thereof will be omitted.

The present invention is characterized in that a single horizontal wing 110 exposed outside through a slim air duct 100 is disposed and first and second guide wings 210 and 220 interconnected as a double link wing are vertically and rotatably disposed above and under the single horizontal wing 110 so that the flow (angle) of air discharged to the internal can be easily adjusted in upward and downward directions by vertical rotation of both the first guide wing and the second guide wings together with the single horizontal wing.

Hereinafter, an apparatus for controlling an air flow direction in a slim-type air vent for a vehicle according to exemplary embodiments of the present invention will be described in more detail.

Figures 3A, 3B:
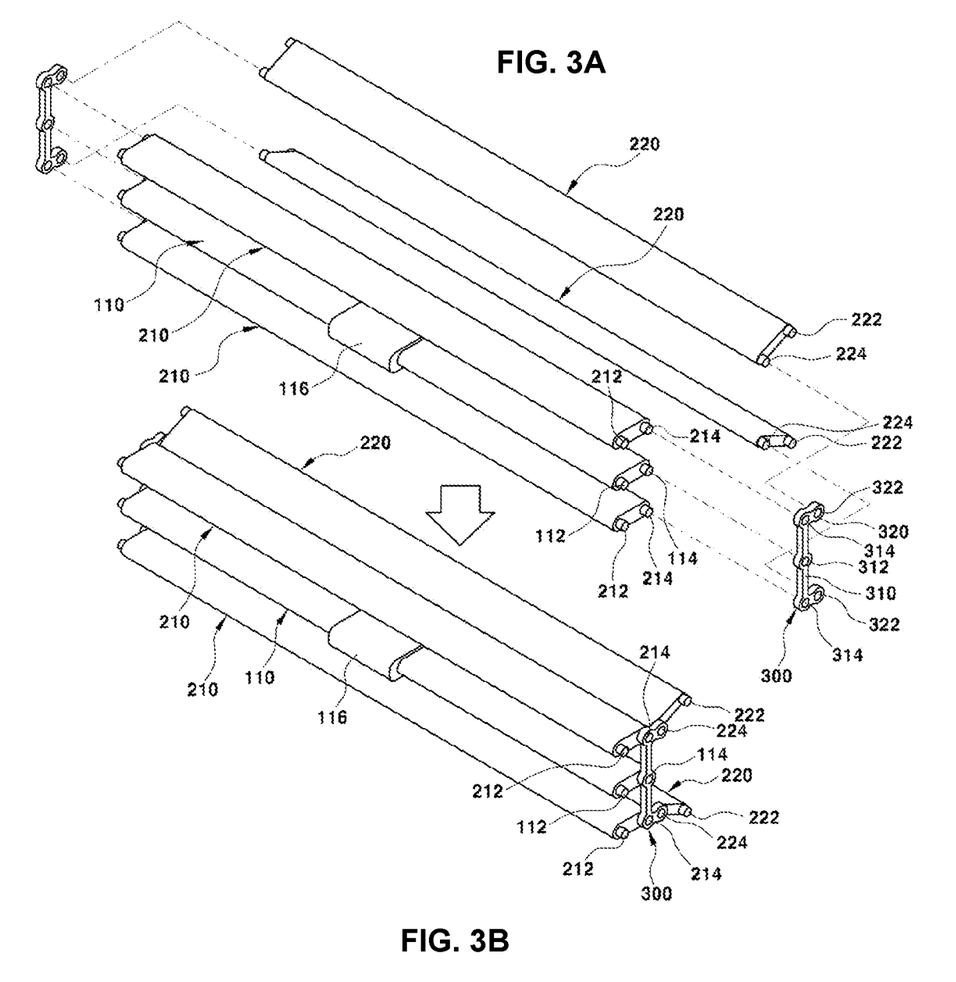
FIG. 3A and FIG. 3B are perspective views illustrating an apparatus for controlling an air flow direction in a slim-type air vent for a vehicle according to various exemplary embodiments of the present invention.
Figure 4:
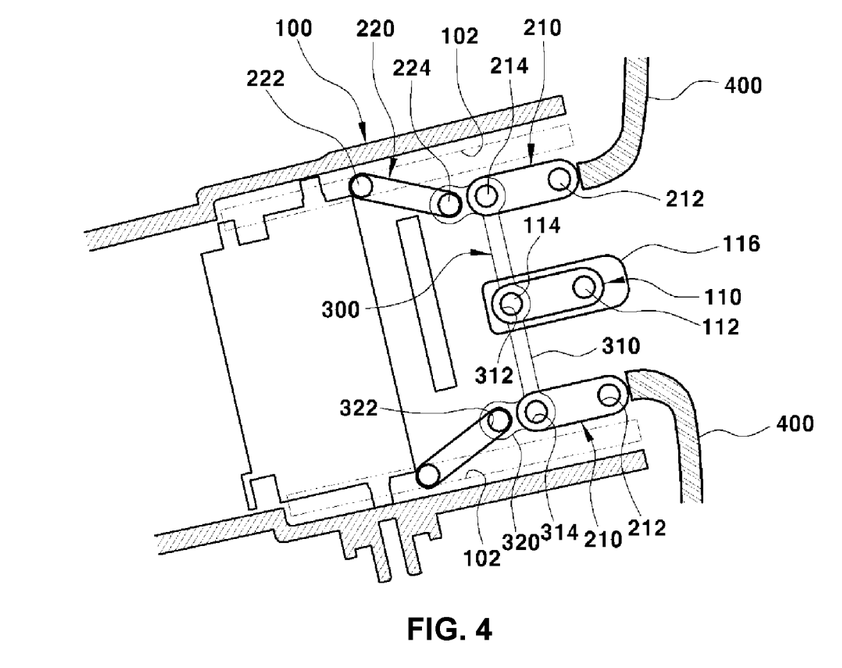
FIG. 4 is a cross-sectional view illustrating the apparatus for controlling an air flow direction in a slim-type air vent for a vehicle according to the various exemplary embodiments of the present invention.

FIGS. 3A and 3B and FIG. 4 are a perspective view and a cross-sectional view illustrating an apparatus for controlling an air flow direction in a slim-type air vent for a vehicle according to various exemplary embodiments of the present invention.

In FIG. 3 and FIG. 4, reference numeral 110 refers to a single horizontal wing.

The single horizontal wing 110 is rotatably mounted at the outlet of a slim air duct 100, and is exposed outside (the vehicle internal).

In more detail, the single horizontal wing 110 has first hinge pins 112 that are formed at front end portions of both sides thereof and are fastened to the internal wall surface of the slim air duct, and first connection pins 114 that are formed at rear end portions of both sides thereof and are fastened to connection links 300.

Accordingly, since the first hinge pins 112 are fastened to the internal wall surface of the slim air duct 100 at the outlet thereof, the single horizontal wing 110 is vertically and rotatably mounted at the outlet of the slim air duct 100.

In the instant case, an operation knob 116 is mounted to the middle of the single horizontal wing 110 so that a user grips the operation knob 116 with his or her hand and adjusts the vertical angle of the single horizontal wing 110.

Each of first guide wings 210 having an identical shape is rotatably disposed above and under the single horizontal wing 110.

Each of the first guide wings 210 has second hinge pins 212 that are formed at front end portions of both sides thereof and are fastened to the internal wall surface of the slim air duct 100, and second connection pins 214 that are formed at rear end portions of both sides thereof and are fastened to the connection links 300.

Accordingly, since the second hinge pins 212 are fastened to the internal wall surface of the slim air duct 100, the first guide wings 210 are vertically and rotatably mounted above and under the single horizontal wing 110.

In addition, a second guide wing 220 is connected to the rear end portion of each of the first guide wings 210 to vertically operate along with the vertical rotation of the first guide wing.

The second guide wing 220 has the same shape as the first guide wing 210. the second guide wing 220 has third connection pins 224 that are formed at front end portions of both sides thereof and are fastened to the connection links 300, and third hinge pins 222 that are formed at rear end portions of both sides thereof and are fastened to the internal wall surface of the slim air duct 100.

In the various exemplary embodiments of the present invention, guide grooves 102 elongated in forward and backward directions are formed in the internal wall surface of the slim air duct 100.

Accordingly, the third hinge pins 222 of the second guide wing 220 are inserted into and fastened to the guide grooves 102 so that the second guide wing 220 is rotatable and rectilinearly movable therealong, and the third connection pins 224 are connected to the connection links 300 so that the second guide wing 220 is rotatably connected to one of the first guide wings 210, with the consequence that the second guide wing 220 is vertically rotatable by operating along with the vertical rotation of the first guide wing 210.

The single horizontal wing 110 is integrally connected to the first and second guide wings 210 and 220 by the connection links 300. Thus, when the single horizontal wing 110 rotates in the upward and downward directions, the first and second guide wings 210 and 220 interlock with each other by the connection links 300 to rotate in the upward and downward directions thereof.

Each of the connection links 300 includes a vertical bar 310 that integrally connects the single horizontal wing 110 to the first guide wings 210, and horizontal bars 320 that are formed integrally with the vertical bar 310 and are connected to the second guide wings 220.

In more detail, the vertical bar 310 of the connection link 300 has a first connection hole 312 which the first connection pin 114 of the single horizontal wing 110 is inserted into and fastened to, and a pair of second connection holes 314 that are vertically formed at a regular distance so that the second connection pins 214 of the first guide wings 210 are inserted into and fastened to the second connection holes 314. The horizontal bars 320, which are integrally formed at the upper and lower end portions of the vertical bar 310 and extend horizontally backward, have third connection holes 322 which the associated third connection pins 224 of the second guide wings 220 are inserted into and fastened to.

Accordingly, the first connection pins 114 of the single horizontal wing 110 are inserted into and fastened to the first connection holes 312 of the vertical bars 310 so that the single horizontal wing 110 is rotatable, the second connection pins 214 of the first guide wings 210 are inserted into and fastened to the second connection holes 314 so that the first guide wings 210 are rotatable, and the third connection pins 224 of the second guide wings 220 are inserted and fastened into the third connection holes 322 so that the second guide wings 220 are rotatable. As a result, the single horizontal wing 110 is integrally connected to the first and second guide wings 210 and 220 by the connection links 300.

In a state in which the single horizontal wing 110 is integrally connected to the first and second guide wings 210 and 220 by the connection links 300, the single horizontal wing 110 is rotatably disposed at the outlet of the slim air duct 100, the first guide wings 210 are rotatably disposed above and under the single horizontal wing 110, and the second guide wings 220 are rotatably disposed at the rear end portions of the first guide wings 210.

Meanwhile, the first guide wings 210 are disposed to coincide with a garnish or a front panel 400 disposed outside the slim air duct 100, in the forward and backward directions, and are thus covered by the garnish or the front panel 400 for aesthetics. Therefore, only the single horizontal wing 110 is exposed inside.

Hereinafter, the operation of the apparatus for controlling an air flow direction in a slim-type air vent having the above-mentioned configuration according to the various exemplary embodiments of the present invention will be described.

Figure 5:
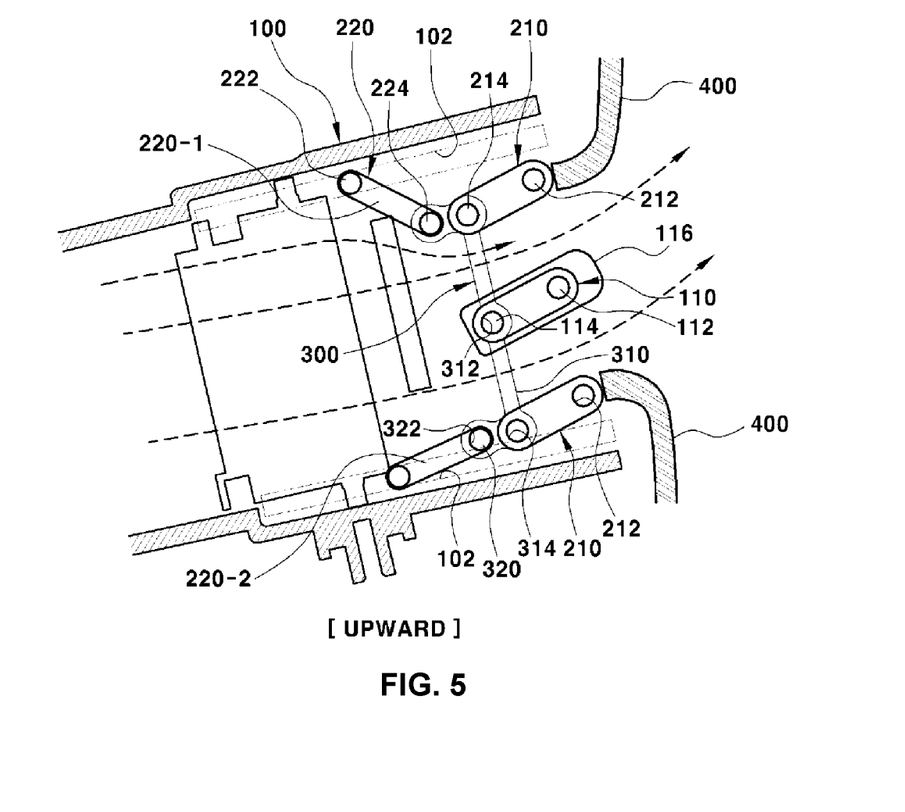
FIG. 5 and FIG. 6 are cross-sectional views illustrating the operation states of the apparatus for controlling an air flow direction in a slim-type air vent for a vehicle according to the various exemplary embodiments of the present invention.
Figure 6:
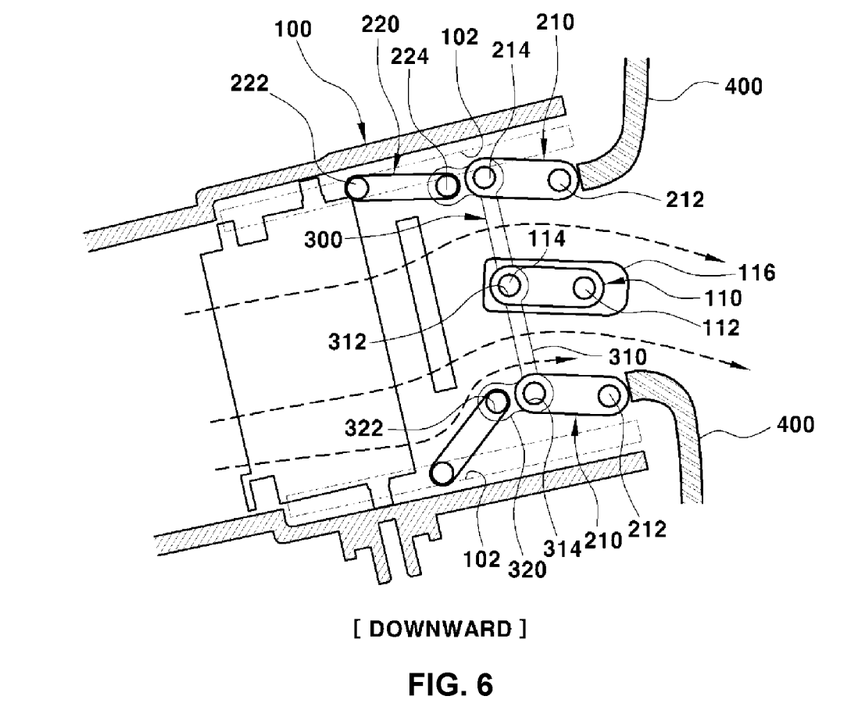

In the various exemplary embodiments, FIG. 5 illustrates a state in which the air flow direction in the slim air duct is controlled upward, and FIG. 6 illustrates a state in which the air flow direction therein is controlled downward.

First, when the user grips and turns the operation knob 116 with his or her hand so that the single horizontal wing 110 rotates about the front first hinge pins 112, the rear end portion of the single horizontal wing 110 rotates downward.

In the instant case, when the rear end portion of the single horizontal wing 110 rotates downward, the connection links 300, which are connected to the first connection pins 114 of the single horizontal wing 110, are moved rectilinearly downward.

Next, when the connection links 300 are moved rectilinearly downward, the first guide wings 210, which are interconnected by the vertical bars 310 of the connection links 300, also rotate downward.

That is, the rear end portions of the first guide wings 210 rotate downward about the front second hinge pins 212.

Accordingly, the single horizontal wing 110 and the first guide wings 210 are obliquely disposed so that their front end portions (toward the internal) are high and their rear end portions (toward the internal to the air duct) are low to guide air in an upward direction thereof.

In addition, when the connection links 300 are moved rectilinearly downward, the second guide wings 220, which are connected to the rear end portions of the first guide wings 210, also rotate.

In more detail, one second guide wing 220-1, which is disposed upward in the slim air duct 100 from among the second guide wings 220, is configured such that the front end portion thereof (a portion in which the third connection pins 224 are connected to the horizontal bars 320 of the connection links 300) rotates while the rear end portion thereof rotates and moves rectilinearly forward by the third hinge pins 222 inserted into the guide grooves 102 of the slim air duct 100.

Accordingly, one second guide wing 220-1, which is disposed upward in the slim air duct 100 from among the second guide wings 220, is obliquely disposed such that the front end portion thereof is low and the rear end portion thereof is high, and is configured to guide air between the single horizontal wing 110 and the upward first guide wing 210.

On the other hand, the other second guide wing 220-2, which is disposed downward in the slim air duct 100 from among the second guide wings 220, is configured such that the front end portion thereof (a portion in which the third connection pins 224 are connected to the horizontal bars 320 of the connection links 300) rotates while the rear end portion thereof rotates and moves rectilinearly backward by the third hinge pins 222 inserted into the guide grooves 102 of the slim air duct 100.

Accordingly, the other second guide wing 220-2, which is disposed downward in the slim air duct 100 from among the second guide wings 220, is obliquely disposed so that the front end portion thereof is high and the rear end portion thereof is low, and thus the other second guide wing 220-2 has almost the same inclination as the first guide wing 210 so that can guide air between the single horizontal wing 110 and the downward first guide wing 210.

Therefore, air is guided by one second guide wing 220-1 and the other second guide wing 220-2 to be discharged upward to the internal through the spaces between the single horizontal wing 110 and the first guide wings 210.

Meanwhile, in the various exemplary embodiments of the present invention, the downward flow of air discharged inside is illustrated in FIG. 6. In addition, since the downward flow of air discharged inside is opposite to the upward flow of air the downward flow of air discharged inside but is performed in the same manner, a detailed description thereof will be omitted.

Figures 7A, 7B:
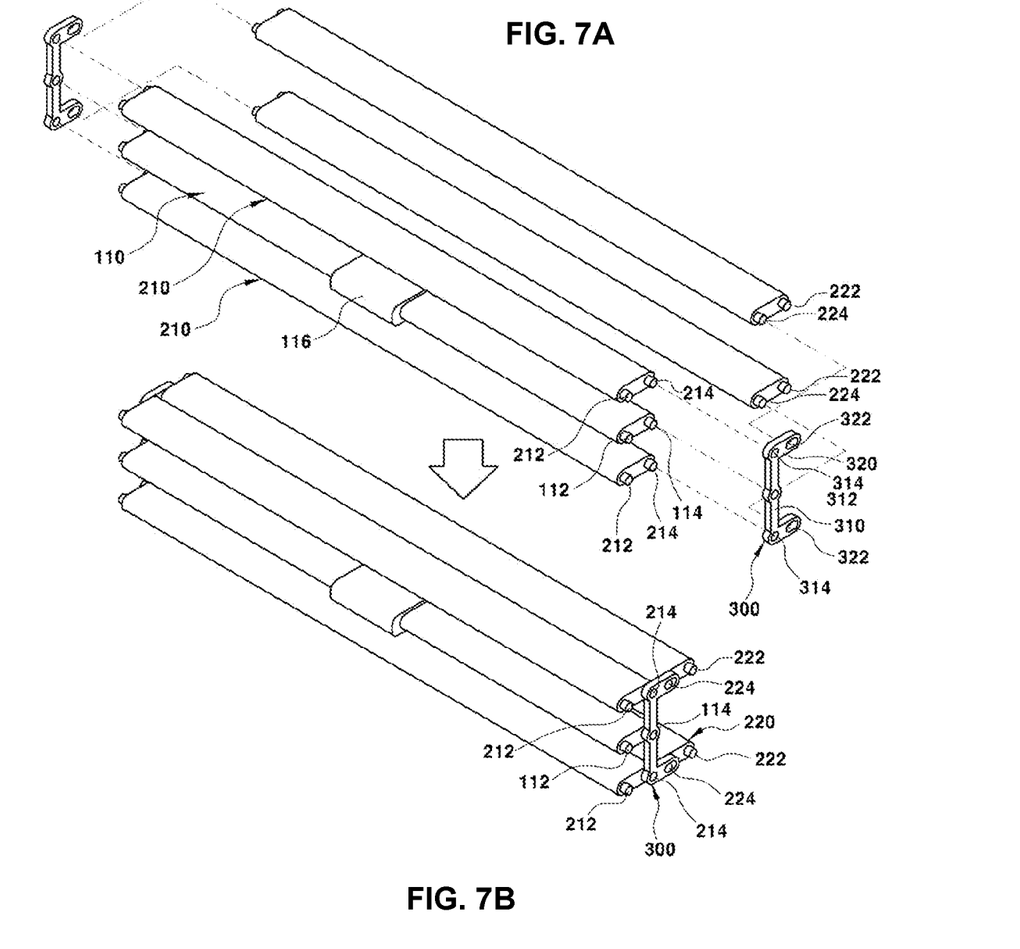
FIG. 7A and FIG. 7B are perspective views illustrating an apparatus for controlling an air flow direction in a slim-type air vent for a vehicle according to various exemplary embodiments of the present invention.
Figure 8:
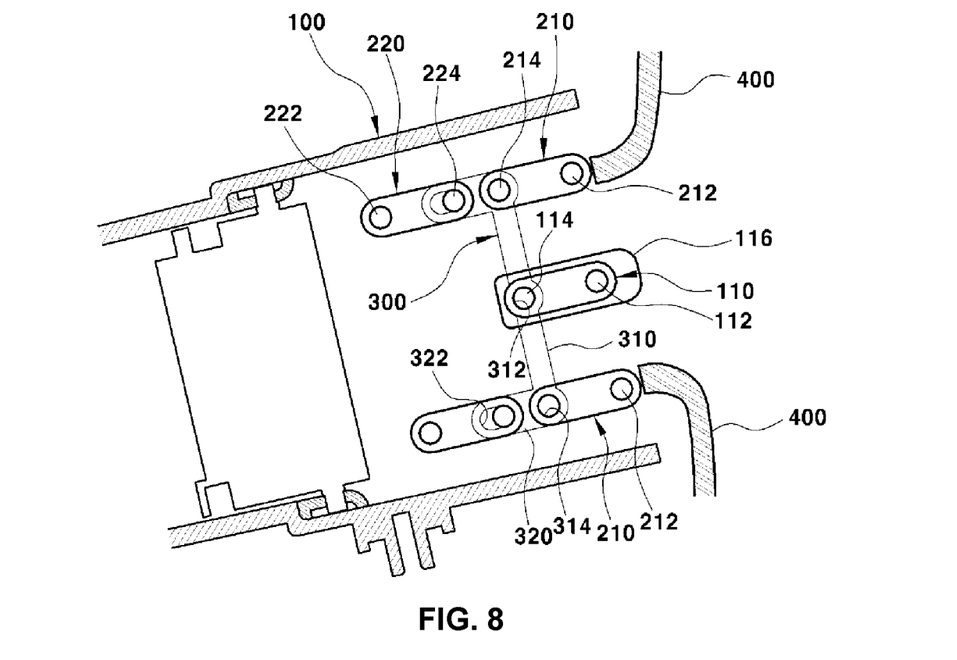
FIG. 8 is a cross-sectional view illustrating the apparatus for controlling an air flow direction in a slim-type air vent for a vehicle according to the various exemplary embodiments of the present invention.

FIGS. 7A and 7B and FIG. 8 are a perspective view and a cross-sectional view illustrating an apparatus for controlling an air flow direction in a slim-type air vent for a vehicle according to various exemplary embodiments of the present invention.

In FIGS. 7A, 7B, and 8, reference numeral 110 refers to a single horizontal wing.

The single horizontal wing 110 is rotatably mounted at the outlet of a slim air duct 100, and is exposed outside (the vehicle internal).

In more detail, the single horizontal wing 110 has first hinge pins 112 that are formed at front end portions of both sides thereof and are fastened to the internal wall surface of the slim air duct, and first connection pins 114 that are formed at rear end portions of both sides thereof and are fastened to connection links 300.

Accordingly, since the first hinge pins 112 are fastened to the internal wall surface of the slim air duct 100 at the outlet thereof, the single horizontal wing 110 is vertically and rotatably mounted at the outlet of the slim air duct 100.

In the instant case, an operation knob 116 is mounted to the middle of the single horizontal wing 110 so that a user grips the operation knob 116 with his or her hand and adjusts the vertical angle of the single horizontal wing 110.

Each of first guide wings 210 having an identical shape is rotatably disposed above and under the single horizontal wing 110.

Each of the first guide wings 210 has second hinge pins 212 that are formed at front end portions of both sides thereof and are fastened to the internal wall surface of the slim air duct 100, and second connection pins 214 that are formed at rear end portions of both sides thereof and are fastened to the connection links 300.

Accordingly, since the second hinge pins 212 are fastened to the internal wall surface of the slim air duct 100, the first guide wings 210 are vertically and rotatably mounted above and under the single horizontal wing 110.

In addition, a second guide wing 220 is connected to the rear end portion of each of the first guide wings 210 to vertically operate along with the vertical rotation of the first guide wing.

The second guide wing 220 has the same shape as the first guide wing 210. the second guide wing 220 has third connection pins 224 that are formed at front end portions of both sides thereof and are fastened to the connection links 300, and third hinge pins 222 that are formed at rear end portions of both sides thereof and are fastened to the internal wall surface of the slim air duct 100.

In the various exemplary embodiments of the present invention, the third hinge pins 222 of the second guide wing 220 are fastened to the internal wall surface of the slim air duct 100 so that the second guide wing 220 is rotatable about a predetermined point.

Accordingly, the various exemplary embodiments of the present invention may exclude the guide grooves 102 formed to be elongated in forward and backward directions in the internal wall surface of the slim air duct 100 for fastening the third hinge pins 222 of the second guide wing 220 in the various exemplary embodiments.

The single horizontal wing 110 is integrally connected to the first and second guide wings 210 and 220 by the connection links 300. Thus, when the single horizontal wing 110 rotates in the upward and downward directions, the first and second guide wings 210 and 220 interlock with each other by the connection links 300 to rotate in the upward and downward directions thereof.

Each of the connection links 300 includes a vertical bar 310 that integrally connects the single horizontal wing 110 to the first guide wings 210, and horizontal bars 320 that are formed integrally with the vertical bar 310 and are connected to the second guide wings 220.

In more detail, the vertical bar 310 of the connection link 300 has a first connection hole 312 into which the first connection pin 114 of the single horizontal wing 110 is inserted and fastened, and a pair of second connection holes 314 that are vertically formed at a regular distance so that the second connection pins 214 of the first guide wings 210 are inserted into and fastened to the second connection holes 314. the horizontal bars 320, which are integrally formed at the upper and lower end portions of the vertical bar 310 and extend horizontally backward, have third connection holes 322 which the associated third connection pins 224 of the second guide wings 220 are inserted into and fastened to.

Accordingly, the first connection pins 114 of the single horizontal wing 110 are inserted and fastened into the first connection holes 312 of the vertical bars 310 so that the single horizontal wing 110 is rotatable, the second connection pins 214 of the first guide wings 210 are inserted into and fastened to the second connection holes 314 so that the first guide wings 210 are rotatable, and the third connection pins 224 of the second guide wings 220 are inserted and fastened into the third connection holes 322 so that the second guide wings 220 are rotatable. As a result, the single horizontal wing 110 is integrally connected to the first and second guide wings 210 and 220 by the connection links 300.

In the various exemplary embodiments of the present invention, the third connection hole 322 of each of the horizontal bars 320 is a slot formed to be elongated in the forward and backward directions, and the horizontal bar 320 further extends in proportion to the length of the slot.

In the instant case, the reason the third connection holes 322 of the horizontal bars 320 are slots elongated in the forward and backward directions is configured to ensure the rotation trajectories of the second guide wings 220 so that the second guide wings 220 easily rotate about the third hinge pins 222 when the connection links 300 are moved rectilinearly upward or downward.

Accordingly, since the third connection pins 224 of the second guide wings 220 are inserted into and fastened to the third connection holes 322 of the horizontal bars 320, the second guide wings 220 rotate and move in the forward and backward directions.

In the state in which the single horizontal wing 110 is integrally connected to the first and second guide wings 210 and 220 by the connection links 300, the single horizontal wing 110 is rotatably disposed at the outlet of the slim air duct 100, the first guide wings 210 are rotatably disposed above and under the single horizontal wing 110, and the second guide wings 220 are rotatably disposed at the rear end portions of the first guide wings 210.

Meanwhile, the first guide wings 210 are disposed to coincide with a garnish or a front panel 400 disposed outside the slim air duct 100, in the forward and backward directions, and are thus covered by the garnish or the front panel 400 for aesthetics. Therefore, only the single horizontal wing 110 is exposed outside.

Hereinafter, the operation of the apparatus for controlling an air flow direction in a slim-type air vent having the above-mentioned configuration according to the various exemplary embodiments of the present invention will be described.

Figure 9:
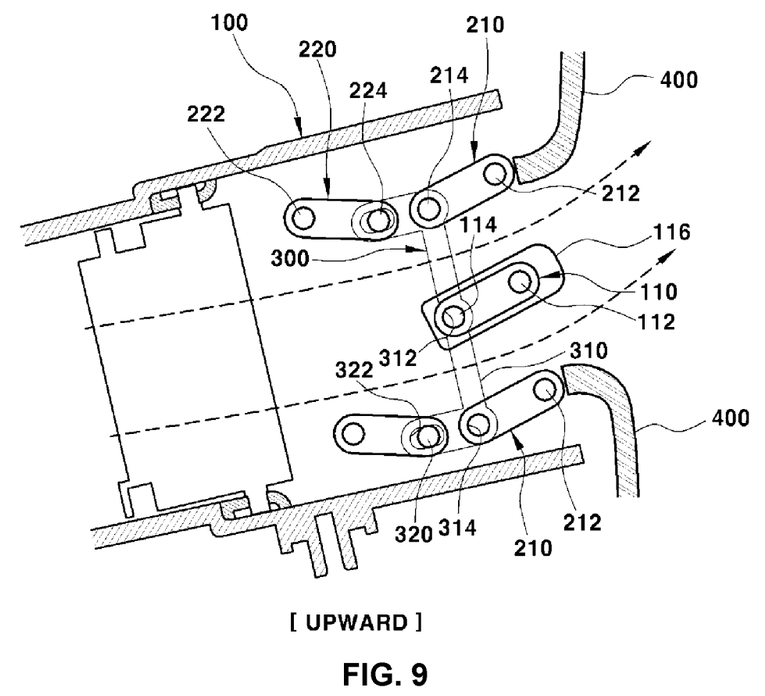
FIG. 9 and FIG. 10 are cross-sectional views illustrating the operation states of the apparatus for controlling an air flow direction in a slim-type air vent for a vehicle according to the various exemplary embodiments of the present invention.
Figure 10:
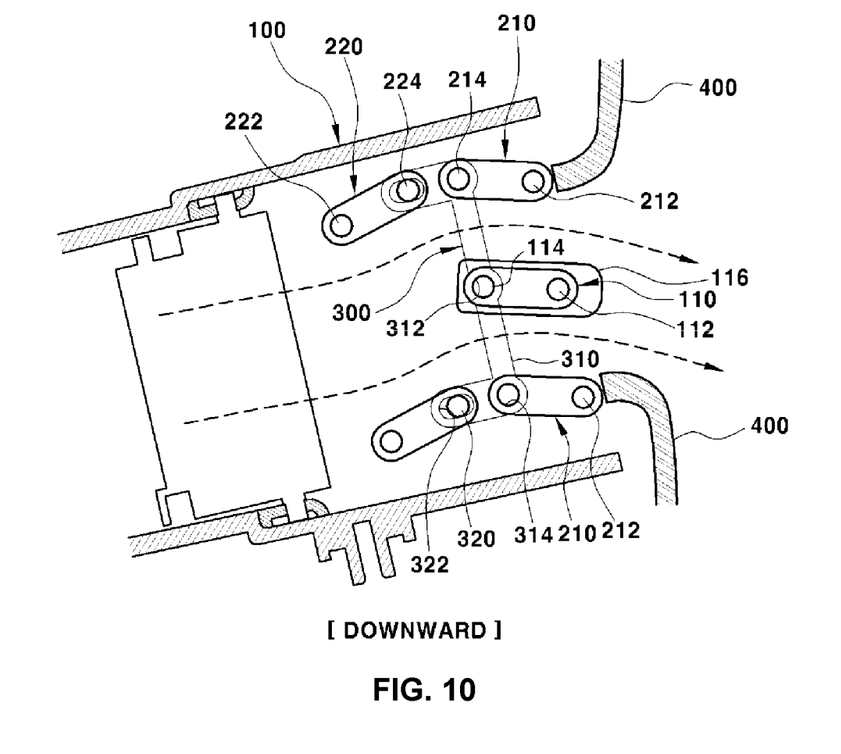

In the various exemplary embodiments, FIG. 9 illustrates a state in which the air flow direction in the slim air duct is controlled upward, and FIG. 10 illustrates a state in which the air flow direction therein is controlled downward.

First, when the user grips and turns the operation knob 116 with his or her hand such that the single horizontal wing 110 rotates about the front first hinge pins 112, the rear end portion of the single horizontal wing 110 rotates downward.

In the instant case, when the rear end portion of the single horizontal wing 110 rotates downward, the connection links 300, which are connected to the first connection pins 114 of the single horizontal wing 110, are moved rectilinearly downward.

Next, when the connection links 300 are moved rectilinearly downward, the first guide wings 210, which are interconnected by the vertical bars 310 of the connection links 300, also rotate downward.

That is, the rear end portions of the first guide wings 210 rotate downward about the front second hinge pins 212.

Accordingly, the single horizontal wing 110 and the first guide wings 210 are obliquely disposed so that their front end portions (toward the internal) are high and their rear end portions (toward the internal to the air duct) are low to guide air in an upward direction thereof.

In addition, when the connection links 300 are moved rectilinearly downward, the second guide wings 220, which are connected to the rear end portions of the first guide wings 210, also rotate.

In more detail, since the third hinge pins 222 formed at the rear end portions of both sides of the second guide wings are fastened to the internal wall surface of the slim air duct 100 and the third connection pins 224 formed at the front end portions of both sides thereof are inserted into and fastened to the slot-shaped third connection holes 322 of the connection links 300 so that the second guide wings 220 rotate and move in the forward and backward directions, the front end portions of the second guide wings 220 rotate downward about the third hinge pins 222 and the third connection pins 224 move backward in the slot-shaped third connection holes 322.

Thus, since the third connection pins 224 move backward in the slot-shaped third connection holes 322, it is possible to ensure trajectories on which the front end portions of the second guide wings 220 rotate downward about the third hinge pins 222.

Accordingly, the second guide wings 220 are obliquely disposed so that the front end portions thereof are low and the rear end portions thereof are high, and are configured to guide air between the single horizontal wing 110 and the first guide wings 210.

Therefore, air is guided by the second guide wings 220 to be discharged upward inside through the spaces between the single horizontal wing 110 and the first guide wings 210.

Meanwhile, in the various exemplary embodiments of the present invention, the downward flow of air discharged inside is illustrated in FIG. 10. In addition, since the downward flow of air discharged inside is opposite to the upward flow of air the downward flow of air discharged inside but is performed in the same manner, a detailed description thereof will be omitted.

In the exemplary embodiments of the present invention, the reason the first hinge pins 112 about which the single horizontal wing 110 rotates are formed at the front end portions of both sides of the single horizontal wing 110 to is configured to continuously maintain the arrangement of the single horizontal wing 110 in a line when viewed from the internal even though the single horizontal wing 110 rotates about the first hinge pins 112, and to express simple aesthetics in appearance by continuously maintaining the arrangement of the single horizontal wing 110 with left and right dummy horizontal wings in a line.

As is apparent from the above description, the present invention has the following effects.

Firstly, first guide wings mounted above and under a single horizontal wing and second guide wings connected to the rear end portions of the first guide wings interlock with each other and vertically rotate by vertical rotation of the single horizontal wing mounted at the outlet of a slim air duct so that the flow of air discharged inside can be easily controlled in upward and downward directions thereof.

Secondly, the first and second guide wings as a double link wing vertically rotate together with the single horizontal wing. Therefore, since the angle of discharge of air in the upward and downward directions is increased, air can be smoothly discharged inside in the upward and downward directions thereof.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. the exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for controlling an air flow direction in an air vent for a vehicle, the apparatus comprising:
a single horizontal wing vertically and rotatably mounted at an outlet of an air duct
first guide wings connected to the single horizontal wing while being disposed both above and under the single horizontal wing to be vertically rotatable;
second guide wings connected to rear end portions of the first guide wings while being disposed inside the air duct, the second guide wings vertically operating along with a vertical rotation of the first guide wings; and
connection links allowing the single horizontal wing to be connected to the first and second guide wings in one such that the first and second guide wings vertically operate along with a vertical rotation of the single horizontal wing,
wherein the second guide wings have third connection pins formed at front end portions of a first side and a second side thereof to be fastened to the connection links, and third hinge pins formed at rear end portions of the first side and the second side thereof to be fastened to an internal wall surface of the air duct, and the second guide wings are vertically and rotatably disposed at the rear end portions of the first guide wings.

2. The apparatus of claim 1, wherein the single horizontal wing has first hinge pins formed at front end portions of a first side and a second side thereof to be fastened to the internal wall surface of the air duct, and first connection pins formed at rear end portions of the first side and the second side thereof to be fastened to the connection links, and the single horizontal wing is exposed outside through the outlet of the air duct and is vertically and rotatably disposed therein.

3. The apparatus of claim 1, wherein the single horizontal wing has an operation knob mounted to an intermediate portion thereof to adjust a vertical angle of the single horizontal wing.

4. The apparatus of claim 1, wherein each of the first guide wings has second hinge pins formed at front end portions of a first side and a second side thereof to be fastened to the internal wall surface of the air duct, and second connection pins formed at rear end portions of the first side and the second side thereof to be fastened to the connection links, and the first guide wings are vertically and rotatably disposed above and under the single horizontal wing.

5. The apparatus of claim 1, wherein the first guide wings are disposed adjacent to a garnish or a front panel which is disposed outside the air duct, and are covered by the garnish or the front panel.

6. The apparatus of claim 1, wherein the third hinge pins of the second guide wings are inserted into and fastened to guide grooves formed to be elongated in forward and backward directions in the internal wall surface of the air duct, and wherein the second guide wings are rotatable and rectilinearly movable therealong.

7. The apparatus of claim 1, wherein the third hinge pins of the second guide wings are fastened to the internal wall surface of the air duct, and wherein each of the second guide wings is rotatable about a predetermined point.

8. The apparatus of claim 1, wherein each of the connection links includes:
a vertical bar having a first connection hole which one of first connection pins of the single horizontal wing is inserted into and fastened to, and second connection holes vertically distanced from the first connection hole, and wherein ends of second connection pins of the first guide wings are inserted into and fastened to the second connection holes; and
horizontal bars integrally formed at upper and lower end portions of the vertical bar while extending horizontally backward, and each of the horizontal bars includes a third connection hole into which a corresponding one of third connection pins of the second guide wings is inserted into and fastened to.

9. The apparatus of claim 8, wherein each third connection hole of the horizontal bars is an opening elongated in forward and backward directions thereof.

10. The apparatus of claim 9, wherein each of the horizontal bars further extends in proportion to a length of the opening in the forward and backward directions.

\* \* \* \* \*